United States Patent

[11] 3,634,752

| [72] | Inventor | Richard S. Willing |
| | | Granada Hills, Calif. |
| [21] | Appl. No. | 709,301 |
| [22] | Filed | Feb. 29, 1968 |
| [45] | Patented | Jan. 11, 1972 |
| [73] | Assignee | Universal Testproducts, Inc. |
| | | Chatsworth, Calif. |

[54] DUAL IGNITOR PROBE
6 Claims, 2 Drawing Figs.

[52] U.S. Cl. ................................................ 324/15
[51] Int. Cl. .......................................... G01m15/00
[50] Field of Search .......................................... 324/15–18,
68 CP, 72.5, 149, 30; 73/116–118; 123/146.5;
339/108, 88

[56] References Cited
UNITED STATES PATENTS

| 2,787,760 | 4/1957 | Sammis | 324/16 |
| 3,035,438 | 5/1962 | Hale | 324/16 |
| 3,373,351 | 3/1968 | Rak | 324/30 |

*Primary Examiner*—Michael J. Lynch
*Attorney*—Lyon & Lyon

ABSTRACT: A dual-probe assembly adapted to be inserted in the access hole of an ignitor housing and having two probe elements, one of which makes electrical contact with the primary terminal of the coil and the other of which establishes a capacitive coupling with the secondary terminal of the coil.

PATENTED JAN 11 1972

3,634,752

INVENTOR
RICHARD S. WILLING
BY
Lyon & Lyon
ATTORNEYS

DUAL IGNITOR PROBE

DESCRIPTION

The present invention relates generally to electrical probes and particularly electrical probes used in automobile engine ignition analysis. More specifically, the present invention relates to a probe having dual elements for use in the analysis of ignition systems employing an ignitor unit.

In automotive vehicles used by the military services, it is common to employ in the ignition systems a unit commonly referred to as an ignitor. An ignitor is usually a combination of the ignition coil and the distributor connected together and placed in a single housing. This housing seals out water from those portions of the ignition system and also provides a means for electrically shielding the coil and the distributor to reduce radio interference. A great many of such units are presently used on military vehicles such as trucks as well as various combat vehicles.

In the housing of such ignitors a single access hole is provided above the ignition coil so that measurements may be made by inserting suitable electrical probes through the access hole to contact the coil terminals. The primary terminal of the coil is readily accessible, but the secondary terminal is surrounded by Bakelite insulation which covers the top of the coil and the top of the distributor housing so that direct electrical contact with the secondary terminal cannot be readily made. Thus, it has been a common practice to insert a capacitive type of probe through the access hole and to position it adjacent the Bakelite housing in order to make measurements of the secondary. While separate probes have been used in the past to make separate measurements on the primary and the secondary ignition circuits, there has yet been no means for making simultaneous measurement or use of both such signals. If measurements of both such circuits are to be made, it has been the common practice to make, for example, measurements on the primary circuit, and then to shut down the engine and remove the first probe to insert a second probe and make the secondary measurements. This is somewhat of a time wasting procedure, and in addition does not provide means for obtaining signals from both such ignition systems simultaneously for various additional electrical tests.

With the recent advent of more sophisticated electrical analysis systems such as the various oscilloscope devices now on the market and the computer-type device such as the Model 1280 sold by Allen Electronic and Equipment Corporation and the subject of the copending application of Muller, et al., Ser. No. 487,390, it has become necessary to have available both the secondary and primary voltage signals not only for direct measurements but for use in other comparative measurements.

It is an object, therefore, of the present invention to provide a dual element probe adapted to be inserted into the access port presently furnished in existing ignitor housings whereby simultaneous measurements of both the primary and secondary ignition signals may be accomplished.

Further objects and advantages of the present invention will become readily apparent upon reading the ensuing detailed description in conjunction with the drawings, in which.

Figures 1, 2:
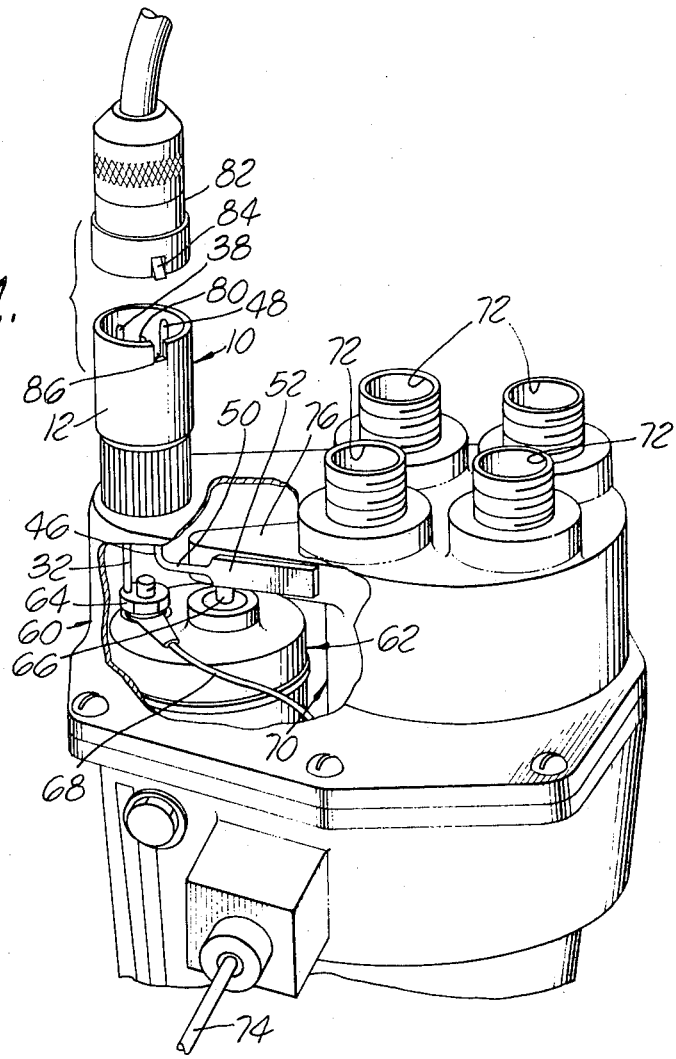
FIG. 1 is a perspective view, partially in section showing the dual element probe installed in a typical ignitor assembly.
FIG. 2 is a perspective sectional view of the dual element probe made in accordance with the present invention.

Referring to FIG. 2, the probe generally designated 10 comprises an upper shell 12 of substantially cylindrical configuration and a rotatable threaded base 14. The lower portion of the shell 12 is provided with a flange 16. The inner bore 18 of the threaded base 14 is also threaded and there is stationed therein a member 20 which has an upper annular collar 22 adapted to coact with the flange 16 of shell 12 to retain the relative positions of the threaded base 14 and the shell 12.

The collared member 20 is provided with an interior bore 24 which is aligned with a bore 26 in the lower portion of the threaded base 14, and through the bores 24 and 26 there is situated a cylindrical insulator 28. A setscrew 30 is threaded radially into the upper portion of the threaded base 14 and adapted to coact with the collar member 20 to lock those two elements in position in order to retain the relative spacing between the collar 22 and the shell flange 16.

The primary contact 32 is situated in a bore 34 which extends vertically through the insulator 28. Inside the bore 34 the small upper end 36 of primary contact 32 is coaxially received in the primary connector pin 38. A compression spring 40 is situated about the end 36 and is interposed between a washer 42 and the lower end 44 of the primary connector pin 38. Thus, the primary contact is spring loaded and the spring 40 urges the primary contact 32 downwardly so that it will be in good electrical contact with the primary terminal of the coil. The washer 42 or other similar element prevents contact 32 from being forced out of the base 34.

Also situated in the insulator body 28 is a secondary contact comprising a wire element 46 extending through the insulator 28 and having a contact 48 and a laterally extending arm 50 to which is attached a vane 52 of substantially rectangular shape. In the upper portion of the shell 12 there is situated a connector insulator 54 which receives the connector pins 38 and 48 and spaces them apart so as to preclude a short circuit between them. A setscrew or other suitable fastener retains the connector insulator 54 in position.

Turning now to FIG. 1, the ignitor housing is generally designated 60 and through the cutaway portion of the drawing, the upper portion of an ignition coil is shown at 62. The primary terminal of coil 62 is shown at 64 and the secondary terminal at 66. The wire 68 shown connected to the primary terminal 64 is connected to the breaker points inside the distributor housing 70. The apertures shown at 72 are for receiving the high-voltage leads connected to the spark plugs. The lead designated 74 connects to the ignitor power input source. As shown in FIG. 1, the probe 10 has been inserted into the access hole of the ignitor and the spring loaded primary contact pin 32 is shown in electrical contact with primary terminal 64.

As previously mentioned, it is exceedingly difficult to obtain direct electrical contact with the secondary terminal since the portions which can be seen in FIG. 1 are all covered with Bakelite insulation and thus a capacitive coupling is the only practical means of measuring the secondary voltage without dismantling the ignitor. Thus, the vane 52 of the probe is positioned adjacent the extension 76 of the distributor housing 70, which extends from the main body of the housing 70 over to and covers the secondary terminal 66. The rotatable threaded base 14 can be threaded into the access hole of the ignitor housing without rotating the probe elements 32 or 52, so the vane 52 can be readily positioned with some precision adjacent the side of the extension 76. In order to obtain a repeatable measurement using capacitive coupling, it is necessary that the spacing between the probe and the conductor carrying the current to be measured be substantially the same in all cases so that unknown variables are not introduced. The dimensions of the projection 76 are sufficiently uniform so that a reasonably good expectation of repeatability may be had. It is only necessary that the vane 52 be reasonably precisely located abutting the side of the projection 76.

In FIG. 1 the connector pin 38 and 48 may be seen as well as an additional pin 80. Actually, pin 80 is not used for electrical purposes but may be included to ease manufacturing techniques or may be used as an indexing or locator pin. A suitable plug 82 may be adapted to be inserted into the top of the shell 12 of probe 10 and may be manufactured in accordance with readily known techniques. A locating tab 84 and cooperating slot 86 may be provided if desired.

Thus, it may be seen from this description that the invention provides a probe which may be easily inserted into the commonly existing single access hole provided in ignitor housings and affords means for making simultaneous use of both the primary and secondary ignition signals, whether use be for measurement of both simultaneously or the use of such signals in making other related ignition analyses. It has been found that although the Bakelite insulation on the distributor housing varies somewhat, that a repeatability factor within ten percent can be realized for secondary voltage measurements. In addition, the use of the probe described in the present invention will at least speed the measurement of signals in the primary and secondary ignition systems since a single installation affords means for making more than one test. While a particular embodiment of the present invention has been shown and described, it will be obvious to persons skilled in the art that changes and modifications may be made without departing from the invention in its broader aspects, and it is the aim of the appended claims to cover all such changes and modifications as fall within the true scope and spirit of this invention.

I claim:

1. A probe for electrical analysis of ignition systems which include an ignitor of the class typically comprising an ignition coil and a distributor surrounded by an electrically and magnetically shielding housing, the invention, comprising:
    a probe body, means for affixing said body to said ignitor housing;
    a primary contact, said primary contact being resiliently mounted in said body for a limited axial movement therein, said primary contact being adapted to make electrical contact with a primary terminal of said ignition coil within said ignitor; and
    a secondary contact, said secondary contact having a wire portion mounted in said probe body, and a laterally extending vane attached to said wire portion.

2. A probe of the type described in claim 1 wherein said primary contact comprises first and second portions, said first portion being rigidly affixed within said body and providing a connector pin, said second portion being mounted in said body for limited axial movement therein, said second portion being telescopically received by said first portion within said body, and resilient means between said first and second portions.

3. A probe of the type described in claim 1 wherein said means for affixing said body to said ignitor comprises a threaded base portion adapted to be received within an access port of said ignitor housing, said threaded base being rotatable with respect to said body.

4. A probe of the type described in claim 2 wherein said means for affixing said body to said ignitor comprises a threaded base portion adapted to be received within an access port of said ignitor housing, said threaded base being rotatable with respect to said body.

5. A probe of the type described in claim 4 wherein said vane comprises a conductive element having a substantially rectangular shape.

6. A probe of the type described in claim 5 wherein said body further includes insulating means separating said primary and secondary contacts.

* * * * *